July 31, 1956 G. J. AGULE ET AL 2,756,765
SYSTEM FOR MAINTAINING LIQUID LEVEL
Filed June 1, 1954

*INVENTORS*
GEORGE J. AGULE and
ROBERT W. REYNOLDS
BY John C. Dorfman
ATTORNEY

United States Patent Office 2,756,765
Patented July 31, 1956

2,756,765

SYSTEM FOR MAINTAINING LIQUID LEVEL

George J. Agule, Stamford, and Robert W. Reynolds, Norwalk, Conn., assignors to Machlett Laboratories, Incorporated, Springdale, Conn., a corporation of Connecticut Application June 1, 1954, Serial No. 433,635

7 Claims. (Cl. 137—386)

This invention relates to a system of liquid level control which may be employed to maintain the level of a cooling liquid. This invention has particular application to extremely low boiling point liquids which tend to evaporate rapidly at room temperature. The proper operation of the system of this invention depends upon a switch which responds to a novel volume changing actuating device.

In the high vacuum art as practiced in the manufacture of high vacuum electron tubes, it is necessary to produce a vacuum which has a pressure of less than $10^{-7}$ mm. of mercury within the vacuum envelope, and an even "harder" vacuum is sometimes required. The methods employed to exhaust vacuum tubes are, generally speaking, relatively standard. First, a mechanical fore-pump reduces the vacuum to about $10^{-4}$ mm. of mercury. Two additional elements located between the fore-pump and the envelope complete the evacuation to the desired degree. The first element is a diffusion pump which removes gas molecules by a current effect. The second element located between the diffusion pump and the envelope is a cold trap wherein certain materials, such as water vapor, are "frozen out." This trap also prevents oil or other materials from the diffusion pump from flowing into the envelope.

In order for the cold trap to function properly, it must be submerged in a very cold material, like liquid air, liquid nitrogen, or the like. If the level of the liquid drops below the trap, the trap will fail to function properly. Thereafter, it is possible that oil from the diffusion pump will get back into the envelope or some other equally undesirable result will occur to cause permanent damage to the envelope or elements therein.

It is difficult to maintain a proper liquid level in open containers of liquid air or other liquids having a boiling point well below the normal ambient temperature. The liquid tends to quickly evaporate from its containing cup so that the level is constantly decreasing. This is the problem encountered with the liquid around the cold trap of the vacuum system previously described. In order to counteract this evaporation, it has been necessary for someone to be available to add more liquid should the level of the liquid fall too low.

Much effort has been devoted to seeking an automatic means of filling the containing cup to the proper level. The means available for accomplishing the filling are limited, but a simple satisfactory means is available. This means involves the application of pressure to the surface of the liquid in a closed reservoir where it is stored in order to cause its flow through a supply line to the cup. Causing the pressure to be applied when more liquid is needed is a problem more difficult of solution, however.

In the prior art there has been some attempt to use thermocouples and other devices to control the flow of liquid into the cup around a vacuum trap. Although some of these devices are operable, they are all relatively complex or involve elements which are relatively fragile. Various factors, such as atmospheric or ambient temperature and the rate of super-cooling, determine the rate of evaporation. Therefore, it is not possible to rely upon some time responsive device to automatically fill the tank to the required level.

The present invention provides a simple system containing a simple device for automatically maintaining liquid air or similar materials at a desired level in a cup, such as that containing the cold trap of a vacuum system. This means is responsive solely to the liquid level in the cup, and operation occurs because the level of the liquid in the cup falls too low rather than for any other reason. Thus, liquid is added when it is needed, and it is added to a predetermined level so that none is wasted.

This system consists of a cup or other container for liquid air or like material and a closed reservoir for the same. A connecting conduit or supply line is made to extend from the bottom of the reservoir to the cup. Another conduit is employed to supply gas under pressure, such as compressed air, to the region in the reservoir above the liquid so that the liquid may be driven out through the supply line to the tank. This same conduit through which the pressure is supplied, or another conduit, is employed as a vent to release the pressure under which the fluid is driven out of the reservoir. When it is necessary to fill the cup, pressure is supplied to the reservoir by compressed air or other gas. When the liquid level is sufficiently high, the pressure within the reservoir is released. Control of the pressure or release of pressure is accomplished through one or two valve means. A single valve is preferably employed in a single supply and pressure relief line, which valve has two positions. In one, the compressed gas is permitted to flow into the reservoir. In the other, the compressor is shut off, and the gas in the reservoir is allowed to escape to the atmosphere. Separate valves may be provided for each function and must be provided if separate supply and pressure relief lines are employed, but they are not preferred. In order to actuate the valves and control the flow of compressed gas or release of it from the reservoir, a solenoid means is preferably provided. A single solenoid is preferably employed to act upon the single valve to produce the desired valve position. In the preferred arrangement when the solenoid is actuated, the valve permits a flow of compressed air into the reservoir, and, when the solenoid is deactivated, the valve is open to permit the flow of air back out of the reservoir to the atmosphere. The solenoid is energized by a switch which switch is mounted on a support with a volume changing actuation member. This actuation member advantageously is composed of a container having a flexible metal portion and a bulb portion designed to be immersed in the liquid in the tank. Within the container is a gaseous filling medium which has the property of having a much lower pressure when the bulb is immersed in the liquid than when the bulb is out of the liquid. The change in pressure within the sealed container causes the flexible metal member to move and adjust the volume of the container. This movement is used to actuate the switch member.

It is possible to use the switch and container combination for other purposes than to actuate the flow of fluid into the container. For instance, the switch might be used directly to shut off the compressor supplying gas pressure to the reservoir. However, such additional applications shall be left to those skilled in the art. Furthermore, one skilled in the art may wish to use the container alone as an actuating device for means other than a switch.

For a better understanding of the present invention reference is made to the following drawing.

Figure 1:
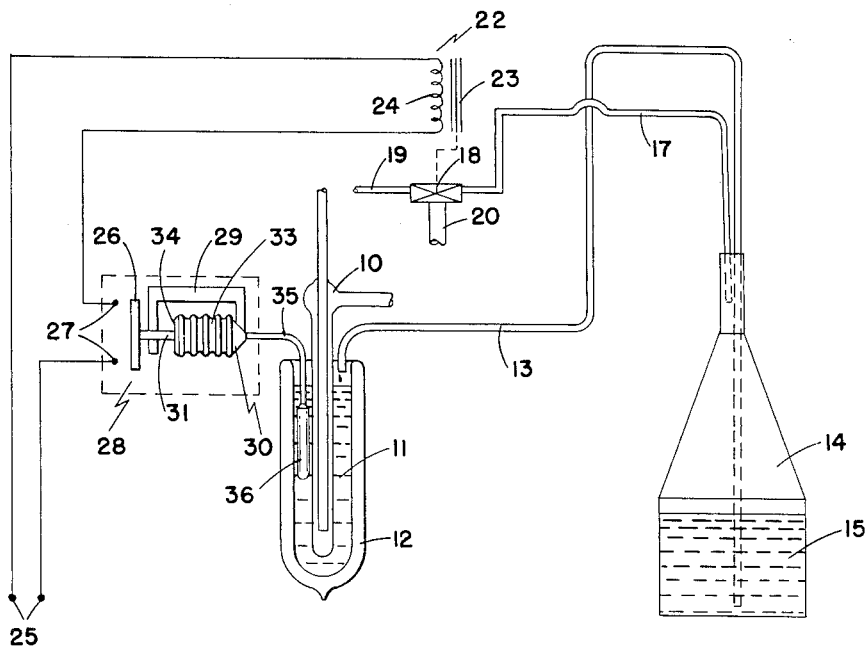
Fig. 1 illustrates schematically a system for controlling liquid level in accordance with the present invention.

Referring to Fig. 1 a system for maintaining the level of liquid air or like material is shown. Illustrated is the vacuum trap 10 of a diffusion pump, such as those used for evacuating the envelopes of electron tubes. Trap 10 is immersed in liquid air 11 which is contained in a tank or vacuum cup 12 which preferably consists of a double walled glass envelope which has an evacuated space between its walls. The purpose of the liquid air is to aid the pump in the removal of gaseous particles by condensation, which occurs because of the extreme cold which it produces within the vacuum trap. If the level of the liquid air drops below the vacuum trap, or even drops to a low level around the vacuum trap, the evacuation of the electron tube or other envelope being pumped will not be complete. Accordingly, it is essential that the level of liquid air be kept high during the entire pumping cycle, particularly in the case of electron tubes. This pumping cycle may last twenty-four hours or longer so that the cost of having personnel available during the whole pumping cycle is prohibitive.

In accordance with the present invention, a feed line 13 is provided between the vacuum cup 12 and the reservoir 14. This feed line advantageously is pipe or tubing which extends close to the bottom of the reservoir below the surface of the liquid air or whatever charge is being used to fill the cup 12. Reservoir 14 is advantageously closed to minimize evaporation and to permit gas pressure to be built up in it in order to drive the liquid 15 out of the reservoir. A pressure supply line 17 is connected through valve 18 which permits connection to a compressor (not shown) or other gas pressure supplying means (not shown) connected to line 19 beyond the valve. The valve 18 which is schematically shown is preferably a two-position valve which when the line to the compressor is shut off will open the valve to the atmosphere through duct 20. Opening the valve permits compressed air or other gas under pressure to pass from the reservoir, through line 17, through the valve and out duct 20.

In order to actuate the valve a solenoid 22 is supplied. The solenoid consists of an iron core 23 which is coupled to the valve such that when the solenoid is actuated or energized by passing a current through coil 24, the core 23 will exert a pull on the valve to put it in such position that the compressor or gas pressure supply in line 19 will be connected to the reservoir. Energy is supplied to the coil 24 through an energy source connected across terminals 25. However, the solenoid cannot be energized until contact member 26 closes the circuit through contact members 27.

The switch member represented by contacts 26 and 27 is mounted on support 28 upon which support bracket 29 is also mounted. Bracket 29 supports the container generally designated 30 and the switch 38 (see Fig. 2) so that plunger member 31 which extends between the container 30 and contact member 26 is movable. The container consists of a flexible metallic member 33 which is advantageously a bellows. The bellows 33 is closed at one end by a wall 34 and is connected at its other end by tubing 35 to a cylindrical bulb portion 36.

Figure 2:
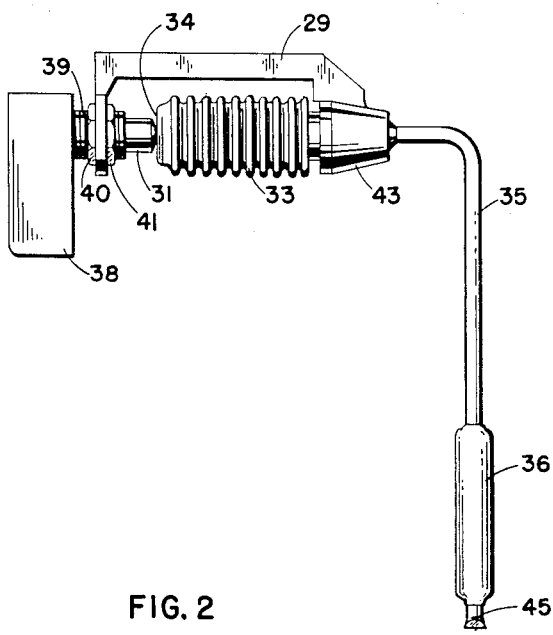
Fig. 2 illustrates in a side elevational view the novel switch and volume changing actuating device of the present invention.

Construction of the switch and container is illustrated in Fig. 2. As may be seen in Fig. 2 the bracket 29 can readily double as support for the container and switch member. The switch member 38 is advantageously a microswitch having a threaded collar 39 around its actuated plunger 31. Bracket 29 may be supplied threaded collar 39 by nuts 40 and 41 which bear against opposite sides of part of the bracket 29 in order to hold the collar in place relative to the bracket. The support bracket 29 is also advantageously connected to a sturdy portion 43 of container 30. Portion 43 advantageously serves as a connection member between the connecting tubing 35 and bellows 33, and as a mounting member for bellows 33. End wall 34 may be an integral part of the bellows 33. The bellows 33 is arranged so that its end wall 34 contacts plunger 31 and so that the expansion of the bellows will drive plunger in and its contraction will permit the spring loaded plunger to be driven out.

The filling material or gaseous charge of container 30 may be introduced through tubulation 45 which is then sealed off. In a preferred embodiment the gaseous charge in the container is air at atmospheric pressure.

After the charge is introduced into the container 30, the switch member 38 should be fixed in place on support member 29 such that the plunger member 31 will be fully depressed (i. e., so that contact member 26 will be in contact with contact terminals 27). Thereafter bulb 36 is introduced into cup 12 as shown in Fig. 1. The liquid air in cup 12 will supercool the bulb 36 and the gaseous contents of the container and cause considerable reduction of the kinetic energy and hence the pressure of the gas filling said container with a reduction in internal pressure. Atmospheric pressure will compress bellows member 33, and plunger member 31, under the urging of a spring, will be urged outward, thus breaking the contact between contact members 26 and 27. This is the normal operating position of the system of Fig. 1, because the liquid air 11 normally contacts bulb 36. As soon as the level of liquid air drops below the level of bulb 36, however, the super-cooling of the gaseous contents of the container 30 is terminated. The ambient temperature tends to rapidly heat the gaseous contents of the container to a point where pressure is sufficiently great to drive the bellows 33 outwardly and depress plunger 31.

As plunger 31 is depressed, contact 26 connects contacts 27 and closes the circuit, thereby energizing coil 24 of solenoid 22. Upon being energized, the core 23 will be pulled into the coil thereby closing the valve 18 in duct 20 and opening it to supply line 19 and the compressor. Compressed air will be forced in through line 17 into reservoir 14, and the increased pressure on the surface of the liquid 15 in the reservoir will cause said liquid to be forced upward and out of the reservoir through line 13 and into cup 12.

As the liquid air level 11 rises above the bottom of the bulb 36 the gaseous contents of the bulb will again be supercooled with a resulting contraction of the bellows member 33 and a breaking of the contacts 26 and 27, thus deenergizing solenoid 22. When the solenoid 22 is deenergized, the valve will return to its normal position thereby cutting off compressor 19 from line 17 and opening duct 20 to line 17. The pressure in reservoir 14 may cause the level of the liquid air to rise somewhat more in cup 12 but the pressure will be quickly dissipated so that there is no danger of the level rising too high.

In addition to operation of the solenoid controlling the valve, the switch 38 may operate the compressor so that the compressor runs only when necessary. It is possible to obtain a higher level filling of the cup member by raising the level of the bulb in the cup. The same result can also be accomplished by delaying the actuation of the solenoid in some manner. Similarly, higher level filling may be accomplished by delaying the reduction of pressure by impeding the flow of air outward through duct 20. In any event, by various devices the required level of the liquid in cup 12 may be maintained by fully automatic means.

As previously mentioned, it is possible to have separate valve means for the compressor and the pressure reducing duct. These separate valves may be operated by a single solenoid or may be operated by two solenoids, in which case a double throw switch will need to be employed.

It will be equally clear to those skilled in the art that the gaseous charge filling container 30 may be varied considerably. For instance, pure oxygen may be used to great advantage in place of air. Likewise, the gaseous charge may be placed within the container under pressure instead of at atmospheric pressure. It is, of course, possible to use a flexible disk or diaphragm other than the bellows member described and illustrated. Any such equivalents may be substituted for other members or components of the structure herein. Of course, the nature of liquid contained in cup 12 may vary considerably. It may be liquid air, liquid nitrogen, liquid oxygen or a variety of other liquids. For the rapid response necessary for the application described, however, it is best that the liquid with which this device be employed have a boiling point not higher than —150° F.

Various changes and modifications have been suggested. Many others will occur to those skilled in the art. All such changes and modifications within the scope of the claims are intended to be within the scope and spirit of the present invention.

We claim:

1. A system for maintaining the level of a liquid material having a boiling point somewhere below —150° F. comprising a cup for said liquid, a reservoir for the liquid supply, a switch device including, in combination, a switch and a container, which container consists of a flexible expansion member and a bulb portion which bulb portion protrudes into the cup below the level at which the liquid is to be maintained, a gaseous material sealed within the container, a support holding the container and the switch in a position relative to one another such that movement of the container produced by pressure changes of the gaseous material it contains will cause actuation of the switch, an actuating solenoid, a circuit for supplying electrical current from a power source through the switch to the solenoid, a valve operable by the solenoid and having alternate positions permitting flow of pressure supplying fluid into the reservoir or the release of pressure from the reservoir, and a supply line between the cup and the bottom of the reservoir.

2. A system for maintaining the level of liquid having a boiling point below —150° F. comprising a cup of said liquid, a reservoir for the liquid supply, said reservoir being closed off from the atmosphere, a feedpipe connection between the bottom of the reservoir and the cup, mean supplying gas pressure to the reservoir, a pressure relief opening connected to the reservoir, pressure supply and pressure release conduits leading into the reservoir and connected respectively with the pressure supply means and pressure relief opening, valve means in the pressure supply and pressure relief conduits selectively permitting the pressure supply means and the pressure relief opening to be connected to the reservoir, a circuit containing a power source and means arranged to actuate the valve means and a switch, a container having a flexible wall portion and a bulb portion which is immersed in the liquid when the liquid is at its proper level, and a gas filling the container, said gas having a greatly reduced pressure when the bulb is immersed in the fluid, and said container being so mounted that the volume change in the container produces movement which actuates the switch and hence controls the valve means.

3. Apparatus for maintaining fluid substantially at a predetermined level within a vessel, said apparatus comprising a reservoir for containing a supply of the fluid and connected with the vessel by a supply pipe, a force pipe connected to the reservoir whereby a force may be applied therethrough to fluid within the reservoir to urge the fluid through the supply pipe to the vessel, and means for controlling the flow of fluid into the vessel comprising a valve in the force pipe, a switch operatively connected with the valve for placing the valve in open or closed condition with respect to passage of the force therethrough, a control device operatively connected with the switch characterized by its ability to expand and contract when subjected to variations in temperature, the control device having a temperature sensitive portion adapted to be located in the fluid in the vessel and to transmit to the control device temperature variations caused by variations in the level of the fluid in the vessel whereby the control device will expand and contract accordingly and function through the switch and valve to control the force applied to the fluid in the reservoir in accordance with the level of the fluid in the vessel.

4. Apparatus for maintaining fluid substantially at a predetermined level within a vessel, said apparatus comprising a reservoir for containing a supply of the fluid and connected with the vessel by a supply pipe, a force pipe connected to the reservoir whereby a force may be applied therethrough to fluid within the reservoir to urge the fluid through the supply pipe to the vessel, and means for controlling the flow of fluid into the vessel comprising a valve in the force pipe, a switch operatively connected with the valve for placing the valve in open or closed condition with respect to passage of the force therethrough, a bellows device having a portion thereof operatively connected with the switch and characterized by its ability to expand and contract when subjected to variations in temperature, the bellows device having a temperature sensitive portion adapted to be located in the fluid in the vessel and to transmit to the bellows device temperature variations caused by variations in the level of the fluid in the vessel whereby the bellows device will expand and contract accordingly and function through the switch and valve to control the force applied to the fluid in the reservoir in accordance with the level of the fluid in the vessel.

5. Apparatus for maintaining fluid colder than ambient atmosphere substantially at a predetermined level within a vessel, said apparatus comprising a reservoir for containing a supply of the fluid and connected with the vessel by a supply pipe, a force pipe connected to the reservoir whereby a force may be applied therethrough to fluid within the reservoir to urge the fluid through the supply pipe to the vessel, and means for controlling the flow of fluid into the vessel comprising a valve in the force pipe, a switch operatively connected with the valve for placing the valve in open or closed condition with respect to passage of the force therethrough, a hollow bellows having one end closed and operatively connected with the switch and having at its other end a hollow bulb member which is adapted to be located in the fluid in the vessel and the interior of which is in communication with the interior of the bellows, the bellows and bulb having a gas sealed therein which is characterized by a large pressure decrease when the bulb is immersed in the fluid and by large pressure increase when the fluid level drops in the vessel, the variations in gas volume in the bellows and resultant expansion and contraction of the bellows functioning through the switch and valve to control the force applied to the fluid in the reservoir in accordance with the level of the fluid in the vessel.

6. Apparatus for maintaining fluid substantially at a predetermined level within a vessel, said apparatus comprising a reservoir for containing a supply of the fluid and connected with the vessel by a supply pipe, a force pipe connected to the reservoir whereby a force may be applied therethrough to fluid within the reservoir to urge the fluid through the supply pipe to the vessel, and means for controlling the flow of fluid into the vessel comprising a valve in the force pipe, a solenoid operatively connected with the valve for opening and closing the valve with respect to the passage through the force pipe of the force applied to the fluid in the reservoir, a switch electrically connected with the solenoid for operation thereof, a control device operatively connected with the switch characterized by its ability to expand and contract when subjected to variations in temperature, the control device having a temperature sensitive portion adapted to be located in the fluid in the vessel and to transmit to the control device temperature variations caused by variations in the level of the fluid in the vessel whereby the control device will expand and contract accordingly and function through the switch, solenoid and valve to control the force applied to the fluid in the reservoir in accordance with the level of the fluid in the vessel.

7. Apparatus for maintaining fluid colder than ambient atmosphere substantially at a predetermined level within a vessel, said apparatus comprising a reservoir for containing a supply of the fluid and connected with the vessel by a supply pipe, a force pipe connected to the reservoir whereby a force may be applied therethrough to fluid within the reservoir to urge the fluid through the supply pipe to the vessel, and means for controlling the flow of fluid into the vessel comprising a valve in the force pipe, a solenoid operatively connected with the valve for opening and closing the valve with respect to the passage through the force pipe of the force applied to the fluid in the reservoir, a switch electrically connected with the solenoid for operation thereof, a bellows having one end closed and operatively connected with the switch and having at its other end a hollow bulb member which is adapted to be located in the fluid in the vessel and the interior of which is in communication with the interior of the bellows, the bellows and bulb having a gas sealed therein which is characterized by a large pressure decrease when the bulb is immersed in the fluid and by large pressure increase when the fluid level drops in the vessel, the variations in gas volume in the bellows and resultant expansion and contraction of the bellows functioning through the switch, solenoid and valve to control the force applied to the fluid in the reservoir in accordance with the level of the fluid in the vessel.

References Cited in the file of this patent

UNITED STATES PATENTS

| | | |
|---|---|---|
| 2,552,962 | Hacker | Mar. 15, 1951 |
| 2,570,451 | Hottenroth | Oct. 9, 1951 |

FOREIGN PATENTS

| | | |
|---|---|---|
| 627,444 | Great Britain | Aug. 9, 1949 |